United States Patent [19]
Clark et al.

[11] Patent Number: 6,065,099
[45] Date of Patent: May 16, 2000

[54] SYSTEM AND METHOD FOR UPDATING THE DATA STORED IN A CACHE MEMORY ATTACHED TO AN INPUT/OUTPUT SYSTEM

[75] Inventors: Leah S. Clark, San Diego; Steven P. Larky, Del Mar, both of Calif.

[73] Assignee: Cypress Semiconductor Corp., San Jose, Calif.

[21] Appl. No.: 08/915,370

[22] Filed: Aug. 20, 1997

[51] Int. Cl.[7] .................................................. G06F 12/00
[52] U.S. Cl. .......................... 711/133; 711/137; 711/143
[58] Field of Search .................................... 711/117, 118, 711/125, 126, 129, 133, 134, 135, 136, 137, 143–145; 395/381, 383; 712/205, 207

[56] References Cited

U.S. PATENT DOCUMENTS

| | | | |
|---|---|---|---|
| 4,077,059 | 2/1978 | Cordi et al. ............................. | 711/143 |
| 5,305,389 | 4/1994 | Palmer .................................... | 711/137 |
| 5,381,539 | 1/1995 | Yanai et al. ............................. | 711/133 |
| 5,537,568 | 7/1996 | Yanai et al. ............................. | 711/118 |
| 5,577,224 | 11/1996 | DeWitt et al. .......................... | 711/118 |
| 5,577,227 | 11/1996 | Finnell et al. .......................... | 711/137 |
| 5,687,350 | 11/1997 | Bucher et al. .......................... | 711/118 |
| 5,706,467 | 1/1998 | Vishlitzky et al. ..................... | 711/129 |
| 5,752,274 | 5/1998 | Garibay, Jr. et al. ................... | 711/206 |
| 5,781,922 | 7/1998 | Braceras et al. ........................ | 711/118 |
| 5,822,764 | 10/1998 | Hardage, Jr. et al. .................. | 711/145 |

OTHER PUBLICATIONS

Clark, L. "Smart PCI Solutions" [Online] http://www.anchorchips.com/solvingio.htm, Apr. 1997.

Clark, L. "Solving I/O Processor Memory and PCI Interface Needs" [Online] http://www.anchorchips.com/solvingio.htm, Apr. 1997.

*Primary Examiner*—Eddie P. Chan
*Assistant Examiner*—Yamir Encarnación
*Attorney, Agent, or Firm*—Christopher P. Maiorana, P.C.

[57] ABSTRACT

A cache memory system connected between an input/output system having an input/output processor and a computer system having a system bus and a main memory with an input/output portion is provided in which data requested by the input/output processor is retrieved from the input/output portion of the main memory, a memory stores the requested data, and the data in the memory is updated either when the processor is not requesting data or when the processor is requesting data already in the memory. A method for replacing memory pages within a cache memory system is also provided.

13 Claims, 5 Drawing Sheets

SYSTEM AND METHOD FOR UPDATING THE DATA STORED IN A CACHE MEMORY ATTACHED TO AN INPUT/OUTPUT SYSTEM

BACKGROUND OF THE INVENTION

This invention relates generally to a system and method for updating the data stored in a cache memory and in particular to a system and method for updating the data stored in a cache memory attached to an input/output system.

Computer systems often have one or more add-on and/or input/output systems attached to the computer system that perform some dedicated input/output function. These add-on and/or input/output systems sometimes include a processor which executes instructions to process the input and/or output data. For example, a digital signal processor may process incoming data and send the processed data on to the main or host CPU. The processor in the input/output system may also need to access data contained in the main memory of the computer system to which it is attached. To decrease the time required to access data contained in the main memory of the computer system and increase the execution speed of the processor in the input/output system, a cache memory system connected between the main memory and the input/output processor may be provided. The cache memory system may include a plurality of sections of memory, called memory pages, which have a predetermined size and may be rapidly accessed by the processor because the cache memory system has a faster access time than the main memory of the computer system. Each memory page of the cache memory may contain a copy of a selected portion of the main memory of the computer system. Each memory page in the cache memory may further include a plurality of cache lines. The cache memory is typically smaller than the main memory of the computer system and cannot store all the data contained in the main memory at all times. Therefore, it is desirable to determine automatically which memory pages of the cache memory have data that is most often requested by the input/output processor. The most often requested memory pages are then maintained in the cache memory because data already in the cache memory may be accessed more rapidly by the input/output processor.

When the processor, in the add-on or input/output system, attempts to access data in the main memory, a controller of the cache memory determines if the cache memory currently contains the requested data. If it does not currently contain the requested data, a memory page within the cache memory is selected to hold a cache memory page sized portion in the main memory which includes the requested data. The data requested from the main memory and any data in the cache line with the requested data is then transferred into the cache memory so that is may be provided to the processor and stored for subsequent accesses by the processor in the add-on or input/output system (hereinafter referred to as the processor).

Each cache line may store two bits of data which indicate the state of the data in the cache line. When data is read into a cache line, a valid bit is set indicating that the data in the cache line was loaded from the main memory and may be used by the processor. Any subsequent accesses to that cache line will return the requested data without having to retrieve the data from the main memory. When the processor modifies the data in a cache line, a modified bit is set indicating that the data in the cache line is different than the main memory and must be written back into the main memory to maintain the coherency of the cache memory and the main memory. In a typical cache memory system used with a multi-processor computer system, for example, coherency between the main memory and the cache memory must be maintained. This is because the main memory is shared by multiple processors and modifications to a cache line should be quickly represented in the main memory. In doing this, the time required to process page misses is reduced but this is achieved by maintaining a high amount of traffic on the bus connecting the cache memory with the main memory of the computer system.

An input/output system, however, may request data from a particular input/output portion of the main memory and the input/output portion of the main memory may only be accessed by the input/output system so that it is not necessary to write back modified cache lines immediately to the main memory. Therefore, a write-back cache memory may be used with these input/output systems. In a write-back cache memory, data modified by the input/output processor is first stored in a cache line in the cache memory and then subsequently written back into the main memory when either the cache memory has time to write the data back or the page containing the modified cache line is needed to store new data requested by the input/output processor.

Because the cache memory is smaller in size than the main memory, all of the data in the main memory cannot be stored in the cache memory. Therefore, it is desirable to provide a system and method for updating the data in the cache memory attached to an input/output system. Typical cache memories write modified cache lines back to the main memory immediately due to the coherency problem described above which reduces the speed of the cache memory. However, an input/output system that uses a predetermined portion of the main memory does not have this coherency problem and thus, it is also desirable to provide a write-back cache memory that efficiently updates the data in the cache memory in a predetermined manner. Thus, there is a need for a system and method for updating the data stored in a cache memory attached to an input/output system which avoid these and other problems of known systems and methods, and it is to this end that the present invention is directed.

SUMMARY OF THE INVENTION

The invention provides a highly advantageous system and method for updating the data in a cache memory system of an input/output system having an input/output processor that may be updated in an efficient manner, but does not immediately write back modified cache lines to the main memory. The cache memory system may use a least recently used stack to track memory pages of the cache memory and indicate that a memory page in the cache memory is older (i.e., the data in the memory page has not recently been used by the processor) or newer (i.e., that data in the memory page has been more recently used by the processor). With this cache memory system, the coherency of the data in the cache memory is maintained at all times, but the temporary incoherency of the data in the main memory is less important.

An updating system in the cache memory system may update the data in the cache memory and may operate when the input/output processor is either not requesting data from the cache memory or requesting data from the cache memory that is already contained in the cache memory. For memory pages of the cache memory that contain data recently used by the input/output processor (e.g., newer memory pages) in a predetermined upper portion of the least recently used stack, the updating system may retrieve data from the main memory of the computer system to fill any empty cache lines in the memory pages so that the most recently used memory pages are completely filled to increase the odds that the processor may request data already resident in the memory pages of the cache memory. For memory pages in the least recently used memory pages of the cache memory, the updating system may write any data modified by the input/output processor back into the main memory so that the least recently used memory pages may be re-used immediately to store new data requested by the processor. The size of the predetermined portions of the least recently used stack may be programmable. The updating system does not fill any empty cache lines for memory pages contained in the lower predetermined portion of the cache memory and also does not write modified data back into the main memory for memory pages in the upper predetermined portion of the cache memory.

The system and method may also provide a system for locking certain memory pages of the cache memory than contain time critical data for the processor so that these locked memory pages cannot be re-used until those memory pages are unlocked or unnailed. The system and method may also provide a system for removing certain memory pages from the cache memory regardless of their position in the least recently used stack so that these memory pages are re-used immediately once any modified cache lines have been written back into the main memory. In addition, a unique system and method for reading the requested data from the main memory is provided in which, during a first request, the actual requested data is read from the main memory directly to the I/O processor, and during a second request, an entire cache line of data including the requested data is loaded into the cache memory. Thus, the processor obtains the requested data as fast as possible and the accuracy of the data in the cache memory is maintained. A unique system and method for writing modified instruction data into the instruction cache is also provided in which the I/O processor may write modified instruction data to the cache memory, but the cache memory controller actually writes the modified cache line immediately into the main memory and resets the valid bit on the modified cache line in the cache memory so that, when the I/O processor next requests the instruction data in that modified cache line, the cache memory controller retrieves the instruction data from the main memory.

In accordance with the invention, a cache memory system connected between an input/output system having an input/output processor and a computer system having a system bus and a main memory with an input/output portion is provided in which data requested by the input/output processor is retrieved from the input/output portion of the main memory, a cache memory stores the requested data, and the data in the cache memory is updated either when the processor is not requesting data or when the processor is requesting data already in the memory. A method for replacing memory pages within a cache memory system is also provided.

DETAILED DESCRIPTION OF A PREFERRED EMBODIMENT

The invention is particularly applicable to a system and method for updating the data in a cache memory connected to an input/output system that includes a microprocessor. It is in this context that the invention will be described. It will be appreciated, however, that the system and method in accordance with the invention has greater utility.

To more fully understand the invention, an example of a conventional cache memory system in a multi-processor environment will be described prior to describing the preferred embodiments of the invention.

Figure 1:
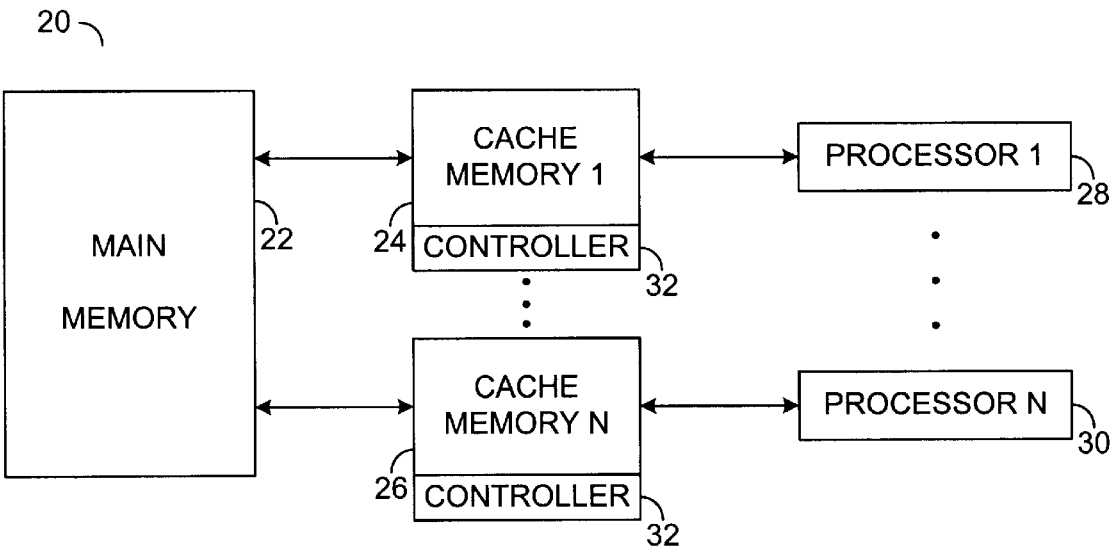
FIG. 1 is a diagram illustrating a conventional shared memory, multi-processor computer system using a typical cache memory system.

FIG. 1 illustrates a conventional multi-processor shared memory computer system 20 that includes a main memory 22, a plurality of cache memory systems 24, 26 connected to the main memory and each cache memory is connected to a respective microprocessor 28, 30. Each cache memory system may include a controller 32 that controls access to the cache memory and the data stored in the cache memory. In this system, the plurality of processors share the main memory so when a processor requests data from the main memory, the requested data may be loaded into the cache memory system associated with the processor, if the data was not already in the cache memory. If the data in the cache memory has been modified by the processor, it must be immediately written back into the main memory since that data may be requested by any of the other processors connected to the main memory. Thus, the coherency of the main memory with the cache memory (e.g., the accuracy of the data in the main memory) is critical and must be maintained. If the coherency of the data is not maintained, another processor may have to wait for the data to be written back into the main memory. Thus, these conventional cache memory system typically write any modified data back into the main memory as quickly as possible. Now, a cache memory system attached to an input/output system in accordance with the invention will be described.

Figure 2:
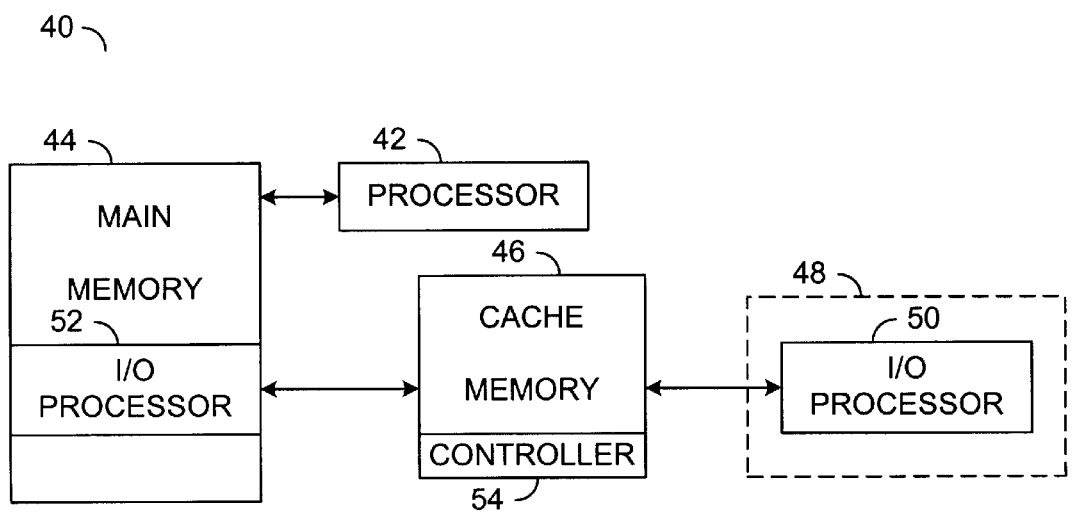
FIG. 2 is a diagram illustrating a cache memory system attached to an input/output system in accordance with the invention.

FIG. 2 illustrates a computer system 40 in accordance with the invention that may include a host processor 42, a main memory 44, a cache memory system 46, and an input/output system 48 that may include an input/output (I/O) processor 50. The computer system 40 may also be any other computer system that has a main memory so that the computer system does not necessarily contain a processor. As shown, a portion 52 of the main memory, referred to as the input/output (I/O) memory, may be reserved and may be accessed only by the I/O processor. The I/O processor may request data from a memory address within the I/O memory 52 and a controller 54 of the cache memory may determine if the data is already within the cache memory and provide the data to the I/O processor. If the data is not currently in the cache memory, the cache controller will retrieve the relevant data from the I/O memory, store it in the cache memory and provide the data to the I/O processor. As described below, the data contained in the cache memory may be updated. The cache memory will be further described below. As shown, the I/O memory is reserved for access only by the I/O processor so that it is important to ensure that the data in the cache memory accurately reflects the main memory, but it is not as important to ensure that the data in the main memory is the same as the cache memory since it may be updated at some later time because no other processor can access the input/output memory. In fact, if the processor modifies the data in the cache memory and then later requests the same modified data, the cache memory may supply the modified data to the input/output processor without accessing the main memory. A write-back cache memory, as described below, may be used in which modified data is not written back into the main memory immediately. The details of the cache memory and the updating scheme will now be described.

Figure 3:
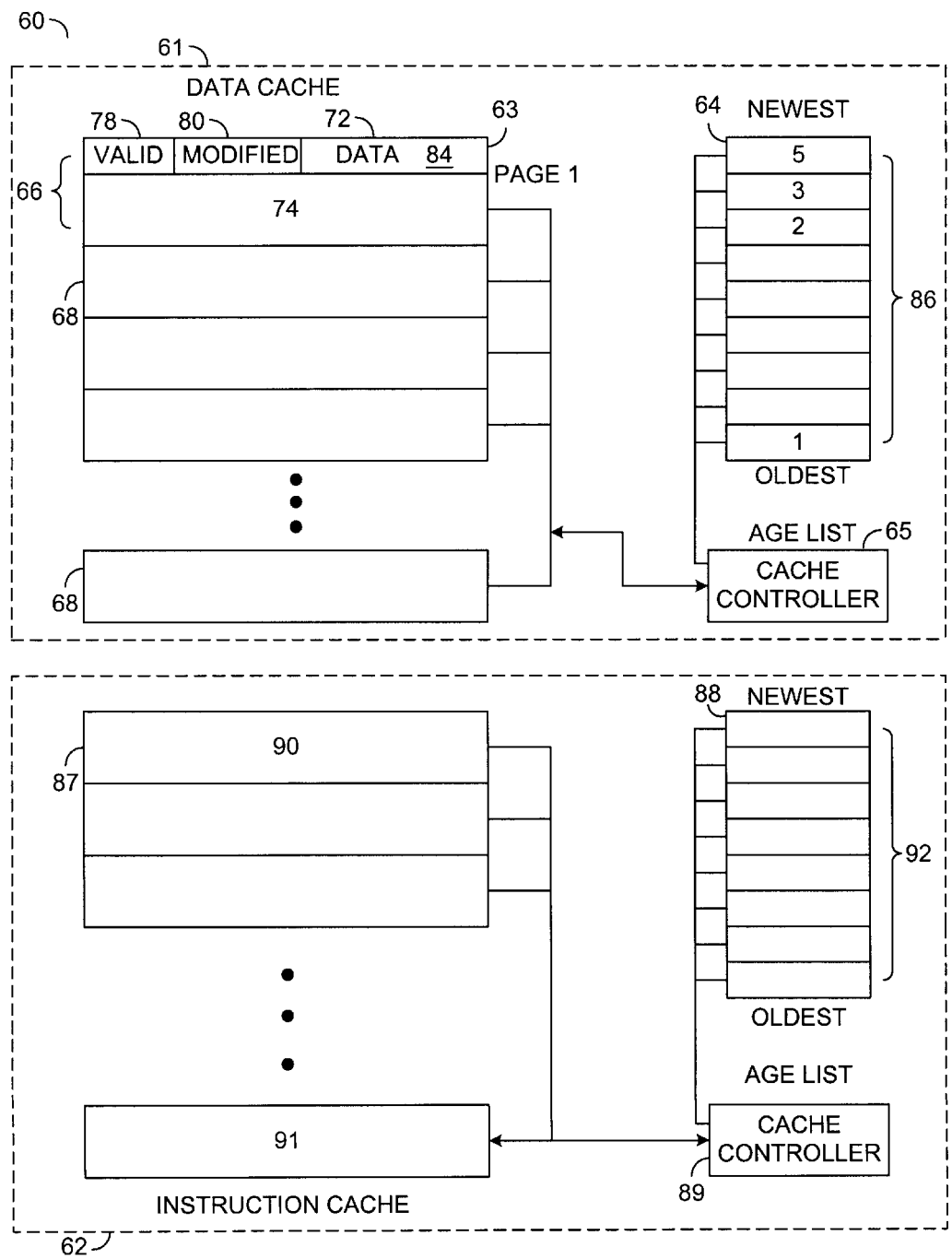
FIG. 3 is a diagram illustrating a cache memory and a cache memory filling and storing technique in accordance with the invention.

FIG. 3 illustrates a preferred arrangement of a cache memory system 60 and preferred cache memory page replacement scheme in accordance with the invention. Since the cache memory will be too small to contain all of the data in the main memory, new data that is requested by the microprocessor and should be present within the cache memory requires a replacement scheme that may, for example, replace the least recently used data by the newer data. The cache memory system 60 in accordance with the invention may include a data cache 61 for storing data accessed by the processor and an instruction cache 62 for storing instructions executed by the processor. The data cache and instruction cache are similar and a detailed description of only the data cache will be provided. The data cache further comprises a cache memory 63, an age list 64 and a cache controller 65. The cache controller controls the operation of the cache memory as well as the age list. The cache memory 63 may include a plurality of pages of memory, such as a first page 66, a second page 68 up to an Nth page 69, that contain copies of cache memory page sized portions of the main memory of the host computer.

The instruction cache and the data cache may each be of any size. For example, each cache may be 8 Kbytes. The instruction cache and the data cache may each be divided into a plurality of memory pages. For example, the instruction cache may contain eight memory pages in which each memory page contains 1 Kbytes while the data cache may have sixteen memory pages in which each memory page contains 512 bytes of data.

When the processor connected to the cache memory attempts to access main memory, a page is selected in cache to hold a copy of the corresponding cache memory page sized portion of the main memory. Each page in the cache may be further divided into a plurality of cache lines, such as a first and second cache line 72, 74 of the first page 66. The cache lines may be of any size, but may preferably be large enough to take advantage of the burst transfer capabilities of the PCI bus. For example, the cache lines may be 256 bits wide (e.g., 8 32-bit words). One byte of data may be retrieved from a cache line so that the coupled memory in accordance with the invention may be used for a plurality of different processors (e.g., 8-bit, 16-bit and 32-bit processors) with different bus widths. The cache has a faster access time than the main memory across the PCI bus and it is desirable to access the cache memory instead of the main memory. The cache controller maintains a map of main memory addresses to cache memory addresses so that the input/output processor will request an input/output processor address and the cache controller may determine whether or not the data referenced by that I/O processor address is already in the cache or is mapped to a main memory address and then supply the appropriate data to the processor. Each cache line in the data cache contains data 84 and may have a valid bit 78 and a modified bit 80 associated with each cache line. Each page of the cache may have a base address associated with it (e.g., the starting address of the memory page) and each cache line may have an address associated with it that is an offset from the page base address to the starting address of the cache line. The valid bit indicates that the data in the cache line has been loaded from the main memory, but does not indicate whether the data is identical to the main memory. The modified bit indicates whether the processor has modified some portion of that cache line (e.g., the cache line is not identical to the main memory) and that cache line needs to be written back into the main memory to maintain coherency between the cache memory and the main memory.

The age list 64 may contain a plurality of storage locations 86 containing a listing of the pages in the cache memory and the age list may be a least recently used (LRU) listing. Therefore, the pages listed at the top and upper portion of the age list are newer (e.g., the data in these pages have been used most recently and are likely to be used again soon) while the pages listed at the bottom or lower part of the age list are older (e.g., the data in these pages have been used least recently and are unlikely to be reused soon). In this example, the fifth page of the cache contains the newest data while the first page contains the oldest data.

The instruction cache 62 may comprise an instruction cache memory 87, an age list 88 and a cache controller 89. The instruction cache memory may have a plurality of memory pages, such as a first memory page 90 and a last memory page 91 which have a plurality of cache lines as described above. The instruction cache may be a read mostly cache since data which is seldom modified, such as set-up vectors and the like, are stored in the instruction cache. The age list may comprise a plurality of storage locations 92 that may function in the same manner as the age list for the data cache. Each cache line in the instruction cache does not have a modified bit and the instruction cache cannot be modified by writing modified instruction data directly into the instruction cache. However, in accordance with the invention, a write around method for modifying data in the instruction cache is provided.

During the write around method, the I/O processor may modify some of the instruction data contained in the instruction cache. The instruction cache memory controller 89 may write the modified instruction data directly back into the main memory and reset the valid bit on the cache line in the instruction cache containing the modified instruction data. Thus, the next time that the I/O processor requests the modified instruction data, the instruction cache memory controller 89 fetches the modified instruction data from the main memory, sets the valid bit, and provides the modified instruction data to the I/O processor. In fetching the instruction data, the instruction cache controller 89 may also perform a fast fetch, as described below. In this manner, the instruction data in the instruction cache may be modified without actually modifying the instruction cache. Thus, although the modified bit of the instruction cache is missing, instruction data may be modified in the instruction cache in accordance with the invention.

The cache memory system may also retain or lock memory pages in the cache memory that contain time critical data so that these memory pages cannot be removed from the cache memory until they are unlocked. In addition, the data in certain memory pages in the cache memory may be removed or flushed at any time regardless of how recently that data was used by the input/output processor.

During the execution of instructions by the processor, when a new main memory address containing either data or an instruction is requested by the processor, the cache controller determines whether the requested data or instruction is currently in the data cache or the instruction cache and supplies the data or instruction to the input/output processor. If the data is already in the cache memory, then the cache simply provides the data to the input/output processor and updates the age list. The data or instruction may not be in its respective cache either because the cache line containing the data or instruction is empty (e.g., the memory page was in the cache, but the cache line was empty which is a page hit with an invalid cache line) or because the entire memory page is not in the cache which is known as a page miss. If the data or instruction is not within the cache, the cache controller assigns a cache memory page to a cache memory page sized portion of the main memory containing the requested data, a cache line size piece of data that contains the requested data is read into the assigned memory page, a valid bit is set for that cache line, and the requested data is supplied to the input/output processor. In a preferred embodiment, when data not in the cache is requested by the processor, a two step read process may occur which obtains the data for the processor as quickly as possible and also loads the data into the cache. In particular, first a block of data (e.g., 32 bits) containing the actual data requested by the processor is read from the main memory and supplied to the processor directly and then, during a second data request, an entire cache line sized piece of data containing the requested data is read from the main memory into the cache memory.

Any subsequent accesses to that memory address or any other page in the cache will be a cache hit because the data is already present in the cache. If the processor writes data into a cache line within a page, the modified bit for that cache line is set which indicates that that cache line needs to be written back into the main memory. The write back of data into the main memory may occur when either the cache has time to write them back or the page is needed to be re-used. The write back method will be described below in more detail.

For any input/output processor access into the cache (e.g., retrieval or write), the age list is updated so that the cache replacement method described below with reference to FIGS. 5 and 6 always has the most current information about which pages in the caches have been most recently accessed. The retrieval of data immediately needed by the input/output processor has the highest priority while the retrieving of missing cache lines from the main memory and the writing back of modified cache lines to the main memory have lower priority and occur whenever the cache is not retrieving data for the input/output processor. In addition, if the method for retrieving missing cache lines and writing back modified cache lines (e.g., the update method) has started, but the I/O processor requests data that is not currently in the cache memory, the updating method may be halted to retrieve the data for the I/O processor unless the updating method is substantially complete. The updating method for retrieving missing cache lines and writing back modified cache lines will be described below with reference to FIGS. 5 and 6. During typical operation, the cache may have some empty pages and a processor request for a new memory location may be assigned to one of the empty pages. When all of the pages are filled, however, the oldest page in the cache may be re-used which requires that any modified cache lines in the oldest page need to be written back into the main memory. It is desirable to ensure that the oldest pages do not have modified cache lines and that the newest pages do not have missing cache lines. Thus, a method for filling and storing data in the cache memory in accordance with the invention will now be described.

Figure 4:
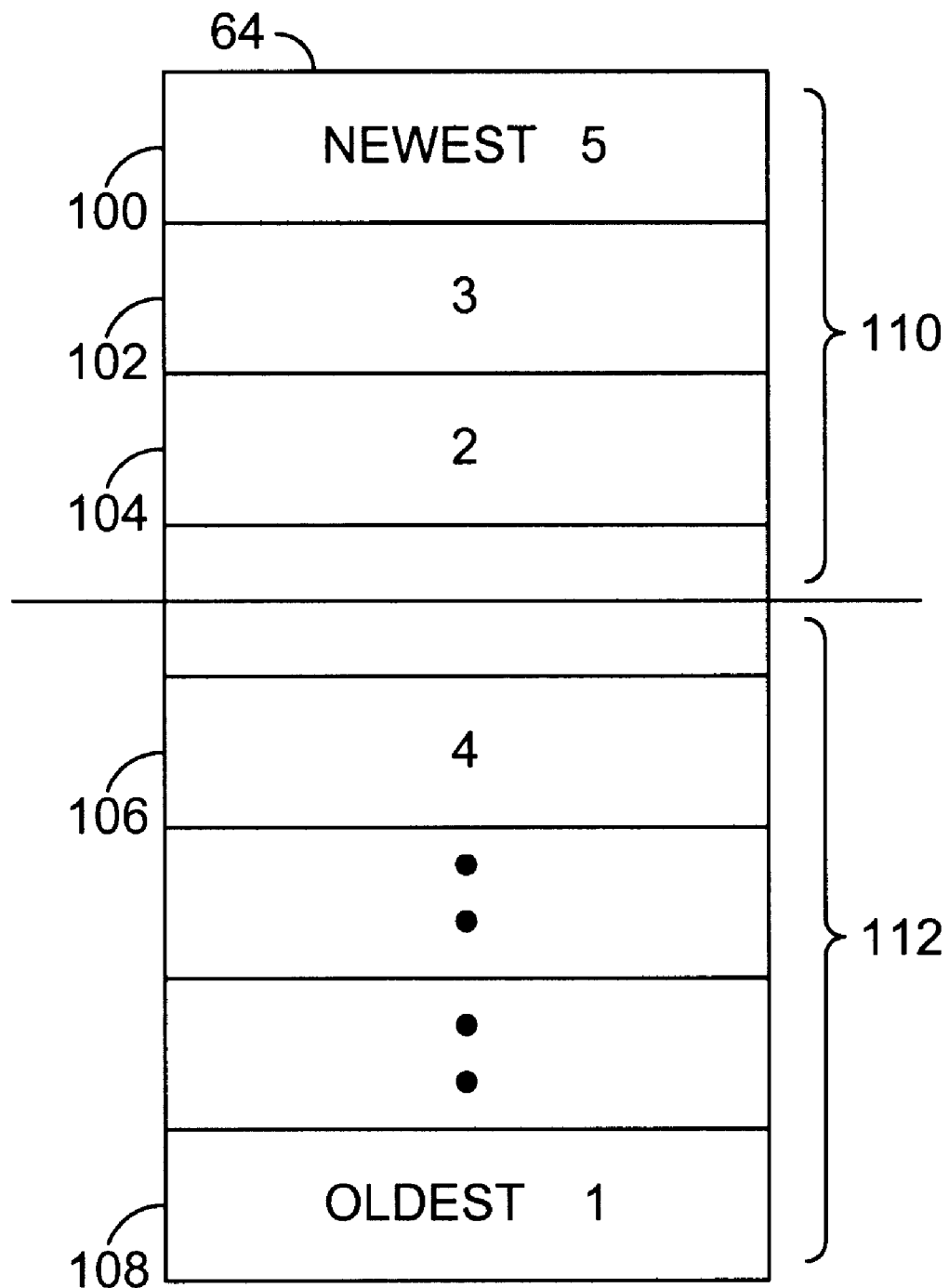
FIG. 4 is a diagram illustrating a preferred method for updating the data in the cache memory in accordance with the invention.

FIG. 4 illustrates the least recently used age list 64 in accordance with the invention that may include a plurality of registers 100, 102, 104, 106 and 108 that hold an address of a memory page within the cache memory. The memory pages most recently accessed by the input/output processor are located in an upper half 110 of the stack and memory pages that have been least recently accessed by the input/output processor are located in a lower half 112 of the stack. In the example shown, the fifth memory page is located in the upper half of the stack and the first memory page is located in the lower half of the stack. During the operation of the cache memory, the stack and the location of the memory pages within the stack is constantly updated every time a memory page in the cache memory is accessed by the input/output processor. In accordance with the invention, missing data in any cache lines in any memory page in the upper half of the stack may be retrieved from the main memory and stored in the appropriate cache line to increase the likelihood that the cache memory will contain any data requested by the input/output processor. In addition, data modified by the input/output processor in any cache lines in any memory pages in the bottom half of the stack will also written back into the main memory so that the least recently used memory pages may be re-used for new data requested by the input/output processor. Now, a preferred method for updating the data in a cache memory in accordance with the invention will be described.

Figure 5:
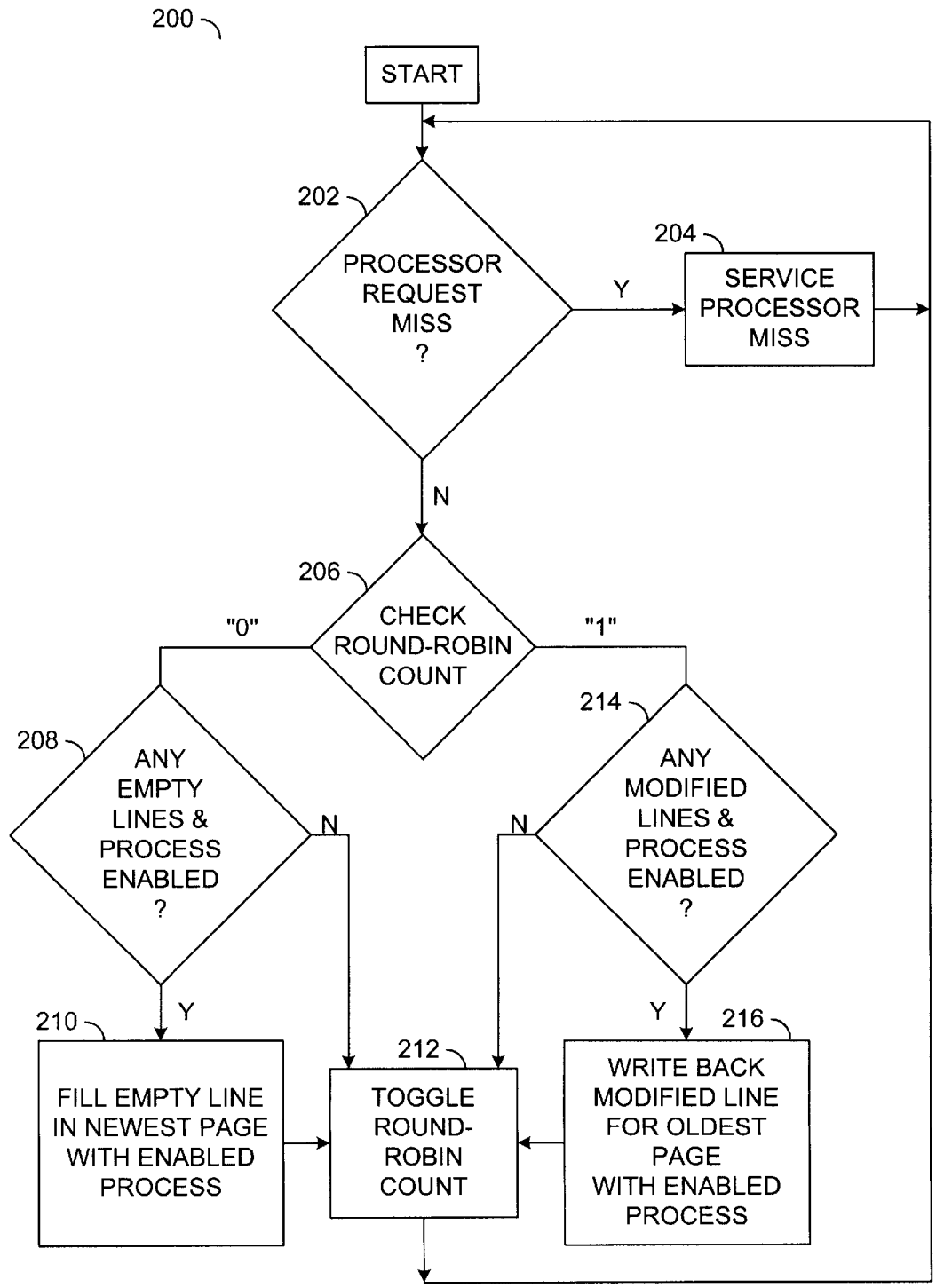
FIG. 5 is a flowchart illustrating a first embodiment of a method of filling and replacing data in a cache memory in accordance with the invention.

FIG. 5 is a flowchart illustrating a first embodiment of a method 200 for replacing pages within a cache memory in accordance with the invention. In this embodiment, only a cache memory with a data cache is described. However, a method for replacing memory pages within a cache memory having a data cache and an instruction cache is described with reference to FIG. 6. Returning to FIG. 5, in step 202, the cache controller determines if there are any processor request misses (e.g., the data requested by the processor is not in the cache), and retrieves any data from the main memory and provides the data to the processor in step 204. Thus, the memory page replacement method operates in the background and a processor request for data always has priority over the replacement method. Thus, if there are not any processor request misses, in step 206, the system determines the current state of the round robin count. The round robin count is a rotational priority scheme which ensures that the retrieval of empty cache lines and the writing back of modified cache lines occurs in a fair manner. Thus, the round robin count rotates between "0" and "1" indicating either to retrieve empty cache lines or write back modified cache lines. If the round robin count is currently "0"then in step 208, the cache controller determines if the next newest page with an empty cache line is beyond a predetermined point in the age list so that the empty cache lines for pages are only filled for certain memory pages within the cache. For example, only memory pages that are above the predetermined point in the age list (e.g., newer memory pages) have their empty cache lines filled while memory pages below the predetermined point (e.g., older memory pages) never have their empty cache lines filled. If the newest memory page with an empty cache line is not below the predetermined point in the age list, then in step 210, the empty cache line of that memory page is filled. Once the empty cache line is filled or if the next newest page with a missing cache line is below the predetermined point in the age list or if there are no missing cache lines in the cache memory, then in step 212, the round robin count is rotated to "1" so a write back operation may occur next time and the method loops back to step 202.

If the round robin count in step 206 is "1", then in step 214, the cache controller determines whether the next oldest page with a modified cache line is below a predetermined point in the age list (e.g., an older memory page) and writes back a modified cache line to the main memory if the next oldest page is below a predetermined point of the age list in step 216. After writing back the modified cache line or if the next oldest page with a modified cache line is above a predetermined point in the age list, then the round robin count is rotated in step 212 so that, the next time through the method, an empty cache line in a new memory page may be filled. The above-described method writes modified cache lines of older memory pages back to main memory and retrieves missing cache lines from newer memory pages efficiently so that fewer cache misses occur. Now, the method for replacement memory pages within a cache memory having a data cache and an instruction cache will be described.

Figure 6:
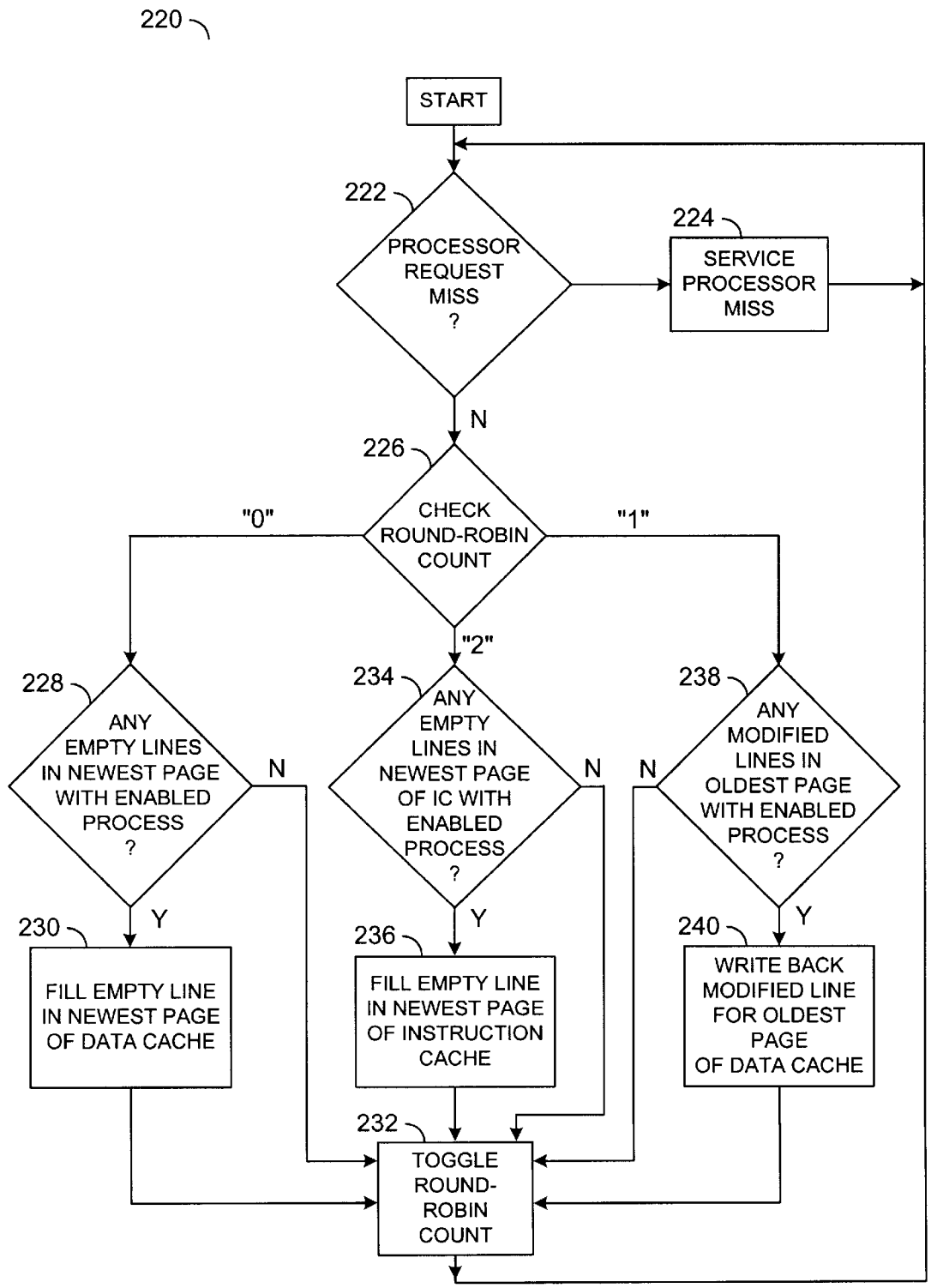
FIG. 6 is a flowchart illustrating a second embodiment of a method of filling and replacing data in a cache memory in accordance with the invention.

FIG. 6 is a flowchart illustrating a second embodiment of a method 220 for replacing pages within a cache memory having a data cache and an instruction cache in accordance with the invention. In step 222, the cache controller determines if there are any processor request misses (e.g., the data requested by the processor is not in the cache), and retrieves any data from the main memory and provides the data to the processor in step 224. Thus, the memory page replacement method operates in the background and a processor request for data always has priority over the replacement method. Thus, if there are not any processor request misses, in step 226, the system determines the current state of the round robin count. The round robin count is a rotational priority scheme which, in this embodiment, ensures that the retrieval of empty cache lines for memory pages in the data cache, the writing back of modified cache lines for memory pages in the data cache, and the retrieval of empty cache lines for memory pages in the instruction cache occur in a fair manner. Thus, the round robin count rotates between "0", "1", and "2" indicating either to retrieve empty cache lines in the data cache or write back modified cache lines in the data cache or retrieve empty cache lines in the instruction cache. As described above, the instruction cache does not have modified cache lines since the processor does not modify the cache lines directly in the instruction cache memory, but instead uses the write around method described above.

If the round robin count is currently "0", then in step 228, the cache controller determines if the next newest page with an empty cache line in the data cache is beyond a predetermined point in the data cache age list so that the empty cache lines for pages are only filled for certain memory pages within the data cache. For example, only memory pages that are above the predetermined point in the age list (e.g., newer memory pages) have their empty cache lines filled while memory pages below the predetermined point (e.g., older memory pages) never have their empty cache lines filled. The predetermined points in the age list may be programmable by either the I/O processor or the processor in the computer system. If the newest memory page with an empty cache line in the data cache is not below the predetermined point in the age list, then in step 230, the empty cache line of that memory page is filled. Once the empty cache line is filled or if the next newest page with a missing cache line is below the predetermined point in the age list, then in step 232, the round robin count is rotated to "1" so that a write back operation may occur next time and the method loops back to step 222.

If the round robin count in step 226 is "1", then in step 238, the cache controller determines whether the next oldest page with a modified cache line in the data cache is below a predetermined point in the age list (e.g., an older memory page) and writes back a modified cache line to the main memory if the next oldest page is below a predetermined point of the age list in step 240. After writing back the modified cache line or if the next oldest page with a modified cache line is above a predetermined point in the age list, then the round robin count is rotated to "2" in step 232 so that, the next time through the method, an empty cache line in a newer memory page of the instruction cache may be filled.

If the round robin count is currently "2", then in step 234, the cache controller determines if the next newest page with an empty cache line in the instruction cache is beyond a predetermined point in the instruction cache age list so that the empty cache lines for pages are only filled for certain memory pages within the instruction cache. For example, only memory pages that are above the predetermined point in the age list (e.g., newer memory pages) have their empty cache lines filled while memory pages below the predetermined point (e.g., older memory pages) never have their empty cache lines filled. If the newest memory page with an empty cache line in the instruction cache is not below the predetermined point in the age list, then in step 236, the empty cache line of that memory page is filled. Once the empty cache line is filled or if the next newest page with a missing cache line is below the predetermined point in the age list, then in step 232, the round robin count is rotated to "0" so that the retrieval of an empty cache line for a memory page within the data cache may occur next time and the method loops back to step 222. As above, this replacement method permits all of the different replacement operations to perform their operations.

While the foregoing has been with reference to a particular embodiment of the invention, it will be appreciated by those skilled in the art that changes in this embodiment may be made without departing from the principles and spirit of the invention, the scope of which is defined by the appended claims.

We claim:

1. A method of replacing data stored in a cache memory system comprising:

generating a round robin count value if a processor connected to a main memory is either requesting data already contained in a cache memory or not requesting data, said cache memory having an age list comprising a plurality of registers containing the addresses of a plurality of memory pages, each comprising a plurality of cache lines within the cache memory;

retrieving data for one or more empty cache lines for a first one or more of said memory pages contained within a first programmable portion of the age list if a round robin count value is equal to a first value;

writing one or more cache lines containing data modified by the processor back to the main memory to be accessed by a second one or more memory pages within a second programmable portion of the age list if the round robin count value is equal to a second value; and rotating the round robin count value so that said one or more empty cache lines are retrieved and the one or more modified cache lines are written back to said main memory.

2. The method of claim 1, further comprising selecting said first programmable portion or said second programmable portion.

3. The method of claim 2, wherein said retrieving and writing back further comprise (i) retrieving said one or more empty cache lines for the first one or more memory pages contained within said first programmable portion of the age list for a data cache if the round robin count value is equal to a first value, (ii) writing said one or more cache lines modified by the processor back to a main memory for the second one or more memory pages within said second programmable portion of the age list for a data cache if the round robin count value is equal to a second value, and (iii) retrieving an empty cache line for a third one or more memory pages contained within a third programmable portion of a second age list for an instruction cache if the round robin count value is equal to a third value.

4. The method of claim 1, further comprising the steps of:
(i) storing data in one or more of said plurality of memory pages; and
(ii) determining whether the data in one or more of said plurality of memory pages was recently requested by the processor.

5. The method of claim 1, wherein the data requested by the processor comprises data operated on by the processor and instructions being executed by the processor.

6. The method of claim 5, wherein storing comprises (i) storing said data operated on by said processor in a data cache and (ii) storing the instructions in an instruction cache.

7. The method of claim 4, wherein said determining comprises (i) storing one or more addresses of one or more recently accessed memory pages in a plurality of registers organized in a stack, wherein said one or more memory pages most recently accessed by the processor are located in a first programmable stack portion of the stack and another one or more memory pages least recently accessed by the processor are located in a second programmable stack portion of the stack and (ii) automatically updating said stack every time the processor requests data.

8. The method of claim 7, wherein said updating comprises (i) retrieving data in an empty cache line of a first one or more memory pages within the first programmable stack portion, and (ii) writing a cache line containing data modified by the processor into the main memory for a second one or more memory pages in the second programmable stack portion.

9. The method of claim 8, further comprising selecting the first programmable stack portion or the second programmable stack portion.

10. The method of claim 6, wherein said instruction cache comprises (i) writing data modified by the processor directly back into the main memory and (ii) resetting a valid bit of the one or more memory pages containing the modified data, wherein the one or more memory pages containing the modified data are retrieved by the instruction cache from the main memory the next time the processor requests the modified data.

11. The method of claim 4, further comprising retaining said one or more memory pages in the cache memory so the processor can access data in the one or more memory pages at any time.

12. The method of claim 7 further comprising writing back the data contained in said one or more memory pages in the cache memory regardless of the location of the one or more memory pages in the stack.

13. The method of claim 1, wherein said retrieving comprises (i) retrieving said requested data for said processor, (ii) providing said requested data to said processor, (iii) retrieving a cache line of data containing said requested data, and (iv) storing said cache line of data in the cache memory.

* * * * *